United States Patent
Hessler et al.

(10) Patent No.: US 12,375,914 B2
(45) Date of Patent: *Jul. 29, 2025

(54) WIRELESS DEVICE AND NETWORK NODE FOR VERIFICATION OF A DEVICE CATEGORY AS WELL AS CORRESPONDING METHODS IN A WIRELESS COMMUNICATION SYSTEM

(71) Applicant: Telefonaktiebolaget LM Ericsson (publ), Stockholm (SE)

(72) Inventors: Martin Hessler, Linköping (SE); Pål Frenger, Linköping (SE); Göran Rune, Linköping (SE); Nicklas Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,952

(22) Filed: Apr. 23, 2024

(65) Prior Publication Data
US 2024/0276220 A1    Aug. 15, 2024

Related U.S. Application Data

(63) Continuation of application No. 17/436,323, filed as application No. PCT/EP2019/055835 on Mar. 8, 2019, now Pat. No. 11,991,521.

(51) Int. Cl.
*H04W 12/06* (2021.01)
*H04L 41/0893* (2022.01)
(Continued)

(52) U.S. Cl.
CPC ........ *H04W 12/06* (2013.01); *H04L 41/0893* (2013.01); *H04W 12/03* (2021.01);
(Continued)

(58) Field of Classification Search
None
See application file for complete search history.

(56) References Cited

U.S. PATENT DOCUMENTS 11,991,521 B2 * 5/2024 Hessler ............... H04L 41/0893
2016/0286391 A1    9/2016 Khan
(Continued)

FOREIGN PATENT DOCUMENTS

| CA | 2566058 A1 | 4/2008 |
| CN | 1922816 A  | 2/2007 |

(Continued)

*Primary Examiner* — Saad Khawar
(74) *Attorney, Agent, or Firm* — Murphy, Bilak & Homiller, PLLC

(57) ABSTRACT

The present invention relates to a method and wireless device for supporting verification of a device category as well as to a method and a network node. It is desired to quickly allow finding out whether a wireless device should be allowed to access a network by verifying a device category. The method at the device comprises receiving from a network node a verification message including a random bit sequence; calculating a verification signature from the random bit sequence by using a verification function assigned to the device category; and transmitting the calculated verification signature to the network node in an uplink message of a random access procedure or in the first uplink message following a random access procedure so as to allow verification of the device category using the verification signature at a network node.

20 Claims, 9 Drawing Sheets

(51) Int. Cl.
*H04W 12/03* (2021.01)
*H04W 12/08* (2021.01)
*H04W 74/00* (2009.01)
*H04W 74/0833* (2024.01)

(52) U.S. Cl.
CPC ......... *H04W 12/08* (2013.01); *H04W 74/002* (2013.01); *H04W 74/0841* (2013.01)

(56) References Cited

U.S. PATENT DOCUMENTS

| | | | |
|---|---|---|---|
| 2018/0007557 A1* | 1/2018 | Lee | H04L 67/12 |
| 2018/0367518 A1 | 12/2018 | Singh et al. | |
| 2022/0038431 A1* | 2/2022 | Macy | G08B 25/08 |

FOREIGN PATENT DOCUMENTS

| | | |
|---|---|---|
| WO | 2006130725 A2 | 12/2006 |
| WO | 2011041419 A1 | 4/2011 |
| WO | 2016076774 A1 | 5/2016 |
| WO | 2016080878 A1 | 5/2016 |

* cited by examiner

WIRELESS DEVICE AND NETWORK NODE FOR VERIFICATION OF A DEVICE CATEGORY AS WELL AS CORRESPONDING METHODS IN A WIRELESS COMMUNICATION SYSTEM

TECHNICAL FIELD

The present invention relates to a method and wireless device for supporting verification of one or more device categories in a wireless communication system as well as to a method and network node. The present invention further relates to a system comprising a wireless device and a network node as well as computer program.

BACKGROUND

With the ever increasing demands from networked society, either on huge traffic volume or very low latency or both, mobile networking needs to continuously evolve to fulfil the requirements. For example, the Next Generation Mobile Networks Alliance defines requirements for 5G networks (5th generation mobile networks or 5th generation wireless systems) which are new networks surpassing current 4G at least in terms of data rate, number of simultaneous connections and spectral efficiency. With the increase in wireless devices and their use in simple and cheap applications, security of the network becomes more and more important.

Currently, within 3GPP there are good mechanisms for maintaining security based upon a shared secret between the network and a wireless device, such as user equipment, UE.

The security system is based on a SIM (subscriber identity module) acting as a security module placed on a detachable or embedded SIM-card which can be used to establish a secure connection and identify the wireless device. The secure connection is usually established by the core network authenticating the wireless device. The result of the authentication is that both the core network and the wireless device generate keys to be used for all active mode communication, between the wireless device and the core network as well as between the wireless device and the radio access network (RAN).

For idle mode operation there is a concern as the wireless device relies on the broadcast messages transmitted to maintain tracking of the network nodes etc.

In paging a wireless device identifies a base station as node of the network and listens for paging messages. Thus, if the wireless device is addressed in a paging message, the wireless device then sends a page response to the core network node which then allows the core network node to deliver downlink data that e.g. may include a trigger causing the wireless device to perform a certain action such as sending of a measurement report. A problem may then occur if fake broadcast messages are sent to the wireless device, e.g. through a fake base station.

On the other hand, also wireless devices may pose security risks in the network, since they may become compromised which is usually not easily detectable by the network, in particular not at an early stage, such as in the random access (RA) procedure.

Compromised wireless devices are a security threat both to end users in possession of a compromised wireless device but also to the network and other users.

A wireless devices is often divided into one part containing the radio functionality and an application part running both system and end-user applications. This has traditionally added security by keeping this separation. However, it is foreseen that in the future low cost wireless devices, e.g. IoT devices, in particular for simple applications, such as for household appliances, can be less secure due to cost cuts in the hardware architecture.

But even if this type of separation stops a compromised application from influencing e.g. the radio functionality in the wireless device multiple types of attacks can be initiated. For example, it may be possible to activate the microphone, camera or other sensors in the wireless devices.

Due to the large number of wireless devices in the network these can be used jointly to do DNS type of attacks. Such an attack can be triggered in several ways, e.g. using a false base-station, fake system information, etc. But it can also be triggered on the application layer, for example, by in a coordinated fashion triggering update functions in applications to overload the system.

A compromised wireless device can also be made to misbehave by triggering other supported functions in the radio services. One type of such an attack that is known is that the wireless device can be triggered to start doing emergency PRACH by targeting the telephone application. This is not currently possible to prohibit, i.e. even if the radio functionality is not compromised, this behavior can be triggered. It has been proposed that it therefore should be possible to control this behaviour, e.g. by using global black listing of compromised wireless devices.

One problem with existing solutions is that a large amount of signalling on top of the random access is needed to detect if a wireless device is compromised or belongs to a user who should be allowed access to the system. This implies that if the system is attacked by e.g. compromised IoT devices, for example, pretending to be high priority users, e.g. sending incorrect information in the RA procedure, this is usually not detected until user verification after the RA procedure, which demands a lot of signalling both over the air and in the core network. In some cases, a compromised device can also be assigned high priority resources if it pretends to be a high priority device, and hence blocking these resources for a short time from the intended usage for either high priority users or lower priority users.

It is thus desirable to provide methods, a wireless device, a network node, a system and a computer program to quickly allow finding out whether a wireless device should be allowed to access a network. That is, it is desired to avoid wasting a lot of signaling on wireless devices of low priority users or wireless devices with the wrong security level.

SUMMARY

Suitable methods, network node, wireless device, system and computer program are defined in the independent claims. Advantageous embodiments are defined in the dependent claims.

In one embodiment, a method carried out by a wireless device of a wireless communication system is provided to support verification of a device category. The method comprises the steps of receiving from a network node a verification message including a random bit sequence and calculating a verification signature from the random bit sequence by using a verification function assigned to the device category. The method further comprises the step of transmitting the calculated verification signature to the network node in an uplink message of a random access procedure. Alternatively, transmitting the calculated verification signature to the network node is carried out in the first uplink message following a random access procedure. This allows verification of the wireless device's category using the verification signature at a network node. The device category is associated with a security level or priority level shared by a group of wireless devices. Accordingly, a reliable and fast verification of a device category can be performed. In particular, signaling in the network can be reduced.

In one embodiment, a method, e.g. carried out by one or more network nodes of a wireless communication system, is provided for verifying a device category. The method comprises the steps of transmitting to a wireless device a verification message including a random bit sequence and receiving a verification signature from the wireless device in an uplink message of a random access procedure. Alternatively, receiving the verification signature from the wireless device is carried out in the first uplink message following a random access procedure. The method further comprises the steps of calculating a comparison signature from the random bit sequence using a verification function assigned to the device category and verifying that the wireless device belongs to the device category assigned to the verification function if the calculated comparison signature and the received verification signature match. The device category is associated with a security level or priority level shared by a group of wireless devices. Accordingly, a reliable and fast verification of a device category can be performed. In particular, signaling in the network can be reduced.

In one embodiment, a wireless device of a wireless communication system is provided to support verification of a device category. The wireless device is adapted to perform the steps of receiving from a network node a verification message including a random bit sequence and calculating a verification signature from the random bit sequence by using a verification function assigned to the device category. The method further comprises the step of transmitting the calculated verification signature to the network node in an uplink message of a random access procedure. Alternatively, transmitting the calculated verification signature to the network node is carried out in the first uplink message following a random access procedure. This allows verification of the wireless device's category using the verification signature at a network node. The device category is associated with a security level or priority level shared by a group of wireless devices. Accordingly, a reliable and fast verification of a device category can be performed. In particular, signaling in the network can be reduced.

In one embodiment, a network node of a wireless communication system is provided to verify a device category. The network node is adapted to perform the steps of transmitting to a wireless device a verification message including a random bit sequence and receiving a verification signature from the wireless device in an uplink message of a random access procedure. Alternatively, receiving the verification signature from the wireless device is carried out in the first uplink message following a random access. The method further comprises the steps of calculating a comparison signature from the random bit sequence using a verification function assigned to the device category and verifying that the wireless device belongs to the device category assigned to the verification function if the calculated comparison signature and the received verification signature match. The device category is associated with a security level or priority level shared by a group of wireless devices. Accordingly, a reliable and fast verification of a device category can be performed. In particular, signaling in the network can be reduced.

In another embodiment, a system is provided comprising the network node including its functional elements, for example, a transmitter, a controller and a receiver, as well as the wireless device including its functional elements, for example, a receiver, a controller and a transmitter.

In another embodiment, a computer program is provided which includes instructions configured, when executed on a processor, to cause the processor to carry out the above-described methods.

Further, advantageous embodiments of the invention are disclosed in the dependent claims.

DESCRIPTION OF THE EMBODIMENTS

Further embodiments of the invention are described with reference to the figures. It is noted that the following description contains examples only and should not be construed as limiting the invention.

In the following, similar or same reference signs indicate similar or same elements or operations.

Figure 1:
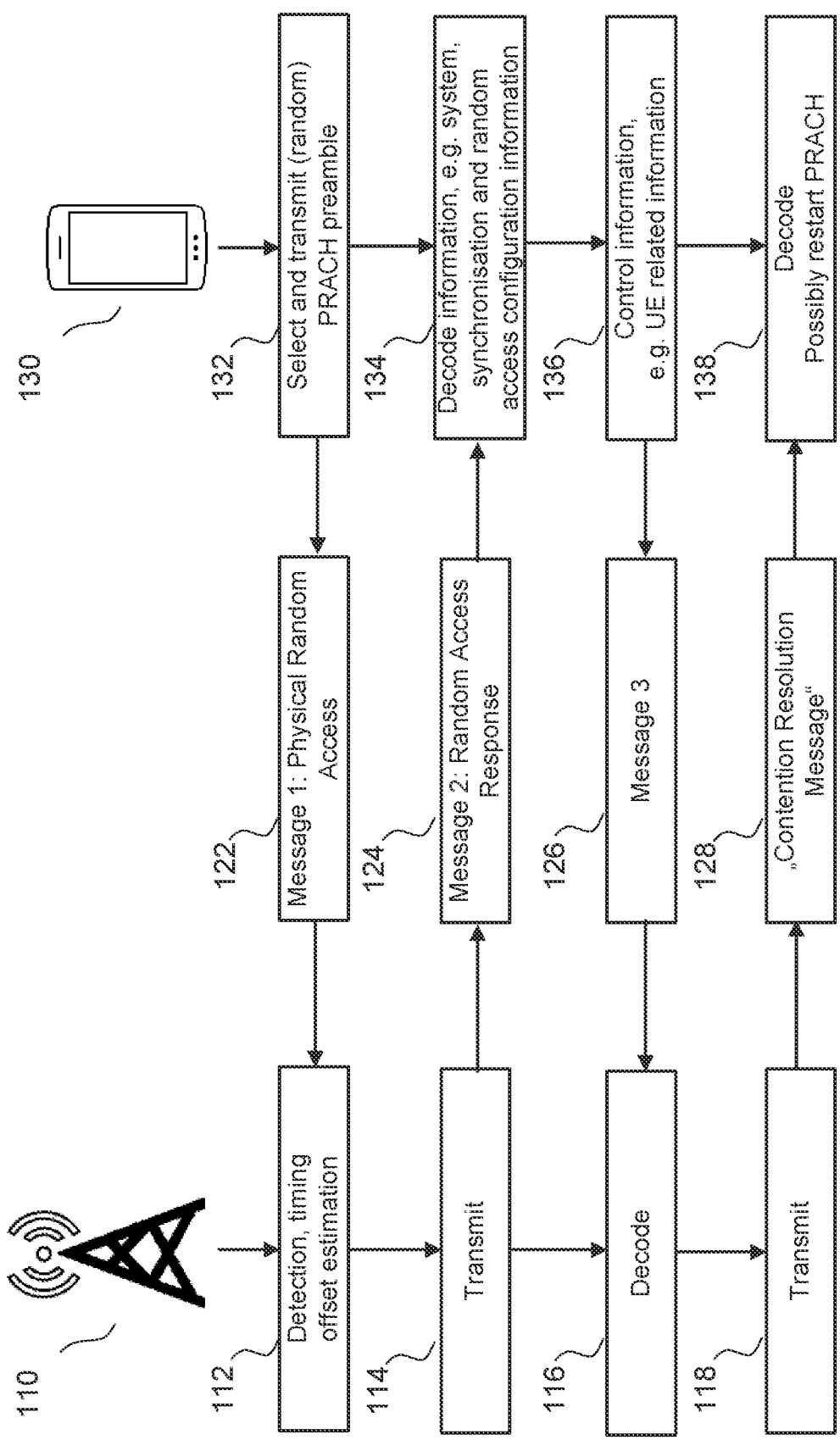
FIG. 1 illustrates operations of a random access procedure.

Random access (RA) is the procedure in which the wireless device initiates communication with a network node of the wireless system, or more particularly a cell provided by the node, by sending a random access preamble on the random access resources, such as the RACH. In this random access procedure information about the system, synchronization and wireless devices is exchanged, see FIG. 1. After the random access procedure the wireless device, such as the UE 130 in FIG. 1, can start communicating with the core network via a network node, such as a base station 110, and identify itself and initiate secure connections with the core network.

The random access procedure, or physical random access procedure, which is used when accessing a cell, may comprise four subsequent messages in the case of a non-contention free random access procedure. These four messages relate to the determination and transmission of access-relevant information from the wireless device/the network node to the network node/the wireless device in a wireless communication system using a downlink channel or an uplink channel. In the case of a contention free random access procedure, the first message and the second message as detailed below may be enough to provide random access of the wireless device to the network node.

A first step 132 comprises transmission of a preamble on a specific physical uplink channel, here referred to as Physical Random-Access Channel, PRACH. This step may also be referred to as transmission of a first message, message 1 or RACH-procedure message 1, indicated by 122. The preamble is transmitted from the wireless device to a network node of a wireless communication system. More specifically, the preamble is transmitted within a configurable subset of slots, the RACH slots, that repeats itself for a given RACH configuration period and detected by a network node 110 indicated in 112.

The next step 114 comprises transmission of a random-access response, RAR, from the network node to the wireless device of a wireless communication system in a downlink transmission by, for example, either using the physical downlink control channel, PDCCH, or the physical downlink shared channel, PDSCH. This step may also be referred to as transmission of a second message, message 2 or RACH-procedure message 2, indicated by 124. The random-access response indicates the reception/detection of the preamble. The random-access response received and decoded by the wireless device in 134 furthermore adjusts the timing of transmission of the wireless device based on the timing of the received preamble by also providing a time-alignment command. Moreover, the random access response may contain a scheduling grant indicating resources, or uplink resources, which the wireless device may use in the next step of the random access procedure. Furthermore, the random access response may contain a temporary identifier, TC-RNTI, used for further communication between the network node or the network nodes and the wireless device of the wireless communication network.

Step 136 comprises transmission of wireless device related information from the wireless device to the network node in an uplink transmission. This step may also be referred to as transmission of a third message, message 3 or RACH-procedure message 3, indicated by 126. Specifically, the third message may be transmitted using uplink shared channel resources, UL-SCH resources and received and decoded in 116. These resources may be indicated in the random-access response of the random access procedure. Moreover, the third message may comprise a device identity, also termed device identifier. This device identity may be used at step four of the random access procedure. The device identifier may be a core-network identifier. Moreover, if the wireless communication system is in the RRC_CONNECTED state or RRC_INACTIVE state, an already assigned unique identity of the device within a given cell, the C-RNTI, is the device identity.

Step 118 comprises transmission of a fourth message from the network node to the wireless device in a downlink transmission. This step may also be referred to as transmission of message 4, RACH-procedure message 4 or contention resolution message, indicated by 128. Specifically, the fourth message may be transmitted using downlink shared channel resources, DL-SCH resources and received and decoded in 138. Moreover, if the unique identity of the device is already assigned within the cell, the network node may transmit the fourth message on the physical downlink control channel, PDCCH, using the unique identity. On the other hand, if the unique identity is not already assigned, i.e. if the device does not have a valid C-RNTI, the contention resolution message may be transmitted on the DL-SCH, using the temporary identifier, TC-RNTI, received in the random-access response.

After reception of the fourth message by the wireless device, the wireless device compares the device identity which was sent to the network node in the third message to either the unique identity or the temporary identifier received in the fourth step. If both, the device identity and the unique identity or the temporary identifier match, the random access channel procedure is considered to be successful; this is the end of the RA procedure. If the corresponding identifiers do not match, the random-access procedure is deemed a failure and may be repeated.

The random access procedure described above is carried out before the wireless device is usually authenticated in the wireless communication system, e.g. before there is a connection with the core network. However, if authentication indicates that the device is not allowed to connect to the core network, e.g. if the device is compromised and pretends to be a high priority device, a lot of signaling is wasted. Thus, it is desirable to obtain at an early stage a reliable indication, advantageously already in the random access procedure, about the category of the device, e.g. the priority level or the security level of the device, to be able to decide quickly whether further message exchanges between the device and network are needed or whether the device should be rejected right away.

One aspect of the invention is to enable the verification of a device category by assigning a verification function, e.g. including a secret key, to the device category. For example, in a typical use-case, this category is associated with a group of wireless devices with higher security requirements (security level) than e.g. IoT devices and possibly even higher than regular enhanced Mobile BroadBand (eMBB) UEs. This can, for example, be for public safety or UEs used for critical services. In another example, in addition or alternatively to the security level, a group of wireless devices may have a higher priority level, e.g. a certain amount of bandwidth is reserved for these wireless devices or they are prioritized when accessing the network.

Figure 2:
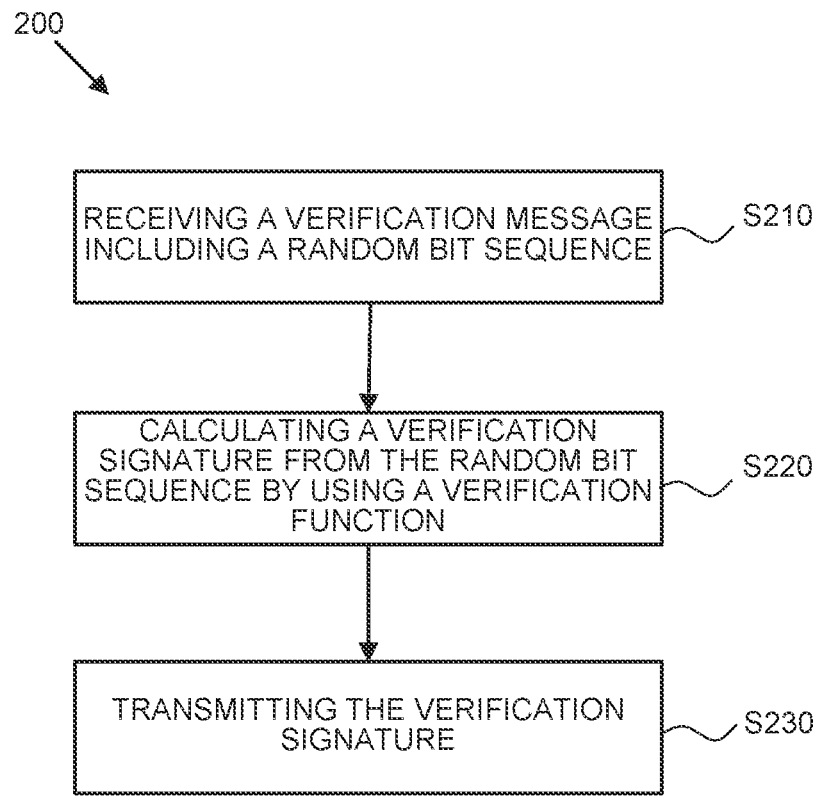
FIG. 2 illustrates operations of a method in a wireless node for supporting verification of a device category according to an embodiment.

FIG. 2 illustrates a flowchart of a method for supporting verification of a device category. The operations, also referred to as steps in the following, of the method may be carried out by a wireless device of the wireless communication system, e.g. a UE or IoT device. For example, the functions described in FIG. 2 can also constitute functional elements in a device, which will be discussed with respect to FIG. 7 later. In the reference signs of the flowcharts, step is indicated as "S" followed by the step number.

The wireless device described herein may be any type of terminal like a user equipment, mobile phone or other kind of terminal, e.g. smartphone, tablet computer, laptop, Personal Digital Assistant (PDA), wearables, etc. Most notably, the wireless device is not limited thereto and may be any wirelessly controllable, intelligent device, including modern kitchen appliances, indoor climate control devices, home entertainment equipment, etc., which can be connected to a wireless network, like in the internet of things.

As can be seen in FIG. 2, the method 200 comprises three steps 210, 220 and 230 carried out in a wireless device of a wireless communication system to support verification of a device category. The wireless communication system is preferably a system of network nodes and wireless devices which connect to certain network nodes acting as random access network, RAN. For obtaining access to the network, the above-described random access procedure is used in which messages are transmitted between a network node and a wireless device in a wireless communication system by using the uplink resources or downlink resources in a wireless communication system, or in other words downlink and uplink information is exchanged between a network node and a wireless device before a secure connection with the core network is established.

In detail, the method comprises step 210 at which a verification message including a random bit sequence is received from a network node. A random bit sequence is used as a verification string/sequence in the method and may be any random sequence of bits, such as a bit string, etc. The random bit sequence has the function of supporting to check whether a correct and valid verification function is assigned to the device. Hence, it may be understood as test data, like data B in FIG. 4, which is known to the network node and the wireless device (after being received) so that a calculated signature, discussed in the next step, can be used to check whether a verification function applied by the device is assigned to a device category. A random bit sequence can also be a seed, e.g. used to generate a pseudo random bit sequence depending on, for example, subframe number or random access opportunity.

The verification message including the random bit sequence may be included in a broadcast message transmitted before, i.e. earlier in time than, the random access procedure. Alternatively, the verification message may be included in a downlink message used in the random access procedure. This downlink message may be the second message in a random access procedure including four messages, such as the one shown above in FIG. 1. Alternatively, this downlink message is the fourth message of the random access procedure comprising an exchange of at least four consecutive messages between the wireless device and a network node.

At step 220, a verification signature is calculated from the random bit sequence by using a verification function assigned to the device category. The verification function allows stopping a third party to send a correct signature. That is, without a valid verification function assigned to a specific device category, a correct signature for this device category cannot be generated.

The verification function may comprise a hash function. The verification signature may be calculated hashing at least the random bit sequence using the hash function. The used hash function should be the same in the wireless device and the network node. An example of hashing data, for instance a random bit sequence, is discussed in process 410 of FIG. 4. Hashing the random bit sequence allows for reducing the length of the random bit sequence. Thus, the data to be transmitted, e.g. the length of the messages to be sent, is reduced.

Furthermore, the verification function may additionally comprise an encryption function. Moreover, the step of calculating the verification signature may further comprise encrypting at least the hashed random bit sequence using a key. An example of encrypting hashed data, for instance a hashed random bit sequence, is discussed in FIG. 4. The key used when encrypting the hashed random bit sequence may be a private or a public key, thus increasing the security when performing verification of the category of the wireless device. The key or the type of the key, for instance whether it is a private key or a public key, may furthermore be associated with the category of the wireless device, thus allowing for further flexibility when verifying the category of a wireless device.

At step 230, the verification signature is then transmitted from the wireless device to a network node. The transmission is carried out using an uplink message, for example, an uplink message of a random access procedure, such as the third message in a random access procedure including four messages. An example of such a random access procedure is presented in FIG. 1, whereas more details are presented in FIG. 6. Transmitting the verification signature in the third message of the random access procedure allows for fast verification of the category of a wireless device, thus saving transmission resources in case the category is not verified by terminating the random access procedure at an early stage.

Alternatively, the uplink message may be the first uplink message following the random access procedure, i.e. the fifth message, if the random access request is considered to be the first message of the random access procedure. More details are presented in FIG. 5. Transmitting the verification signature in the fifth message allows for saving transmission resources in the random access procedure because the additional data is transmitted after the random access procedure is finished.

Forwarding the signature to the network node allows verification of the device category using the verification signature at the network node. In particular, this verification is thus carried out before identifying a wireless device's identity and authenticating it in the network.

Moreover, as explained with respect to FIG. 9 later, the verification does not have to be performed by the network node 910 transmitting the verification message, but can be performed by a different network node 920. This allows for increased configurational flexibility resulting in specialized network node configuration being possible, e.g. having one specialized network node being configured to perform the verification efficiently while the remaining nodes of the network act only to transmit the received verification signature to the one network node. Thus, specialized, simplified and more effective processing of network communications is possible.

Figure 3:
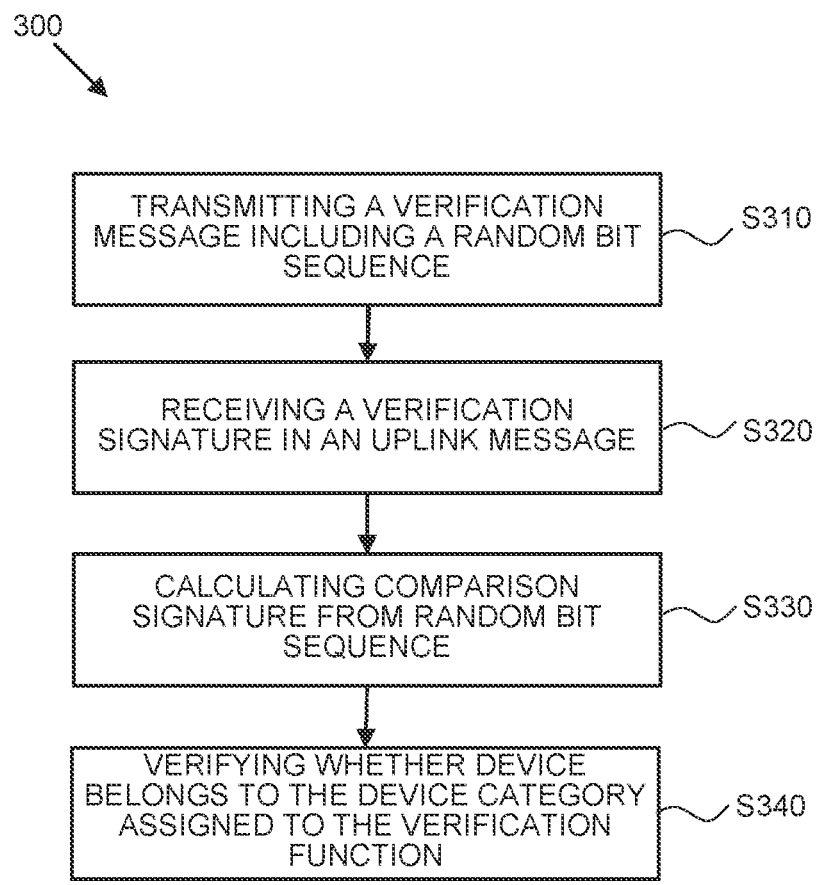
FIG. 3 illustrates operations of a method in a wireless communication system, in particular in one or more network nodes of the system, for verifying a device category according to an embodiment.

As can be seen in FIG. 3, the method 300 comprises four steps 310, 320, 330 and 340 carried out in a wireless communication system to support verification of a device category. Preferably, the method is carried out by at least one network node of the network nodes forming the wireless communication system, but may also be carried out by two or more network nodes. For obtaining access to the network, the above-described random access procedure including four messages is used.

In detail, the method 300 comprises the step 310 where a verification message including a random bit sequence is transmitted to a wireless device from a network node. The verification message and random bit sequence are the same ones as discussed above with respect to FIG. 2 and are received by the wireless device.

As mentioned above, the wireless device calculates the verification signature which is later received at step 320 by the network node from the wireless device in an uplink message of a random access procedure or in the first uplink message following a random access procedure. Details about the messages are discussed above.

At step 330, a comparison signature is calculated at the network node from the random bit sequence using a verification function assigned to the device category. An example of calculating the comparison signature is discussed in process 420 of FIG. 4. The comparison signature may be calculated from the same random bit sequence and with a verification function corresponding to the verification function used in the wireless device.

For example, if the verification functions are not corresponding to each other, e.g. the verification function at the network node does not comprise a decryption function corresponding to an encryption function of the verification function of the wireless device, verification cannot be performed indicating that the wireless device is compromised (this should lead to a mismatch in verification, as discussed below in FIG. 4). Similarly, if the hash function in the network node and wireless device are different, mismatch should occur. This allows for increased security in the communication system because compromised wireless devices (not having a certain assigned category) can be easily and reliably detected.

From steps 320 and 330, it should be clear that step 330 may also precede step 320, since these steps should not be limited to a specific sequence.

At step 340, it is verified that the wireless device belongs to the device category assigned to the verification function based on a comparison using the calculated comparison signature and the received verification signature. An example of verifying that the wireless device belongs to the device category assigned to the verification function is discussed in FIG. 4. As indicated in FIG. 4 below, a mismatch is a strong indication that there has been some tampering with the wireless device, particularly its category and/or verification function. Accordingly, verification can be done by checking the device category which gives a reliable indicator and cannot be easily faked due to the assignment of a verification function to the device category. Verification as herein used, may be identifying the device category and authenticating that wireless device really belongs to this device category.

It has to be noted that the hash function comprised in the verification function of the network node may be the same hash function as comprised in the verification function of the wireless device. Hence, if only the same hash function and no encryption is used, the verification function used when calculating the comparison signature can be the same verification function used in the wireless device.

In both of the above methods the device category is associated with a security level or priority level shared by a group of wireless devices. This is, a group of wireless devices may be defined as all UEs for the operator of a network, a subscription category, i.e. MBB UEs, IoT UEs, public safety UEs, URLLC UEs, gold subscription UEs etc. A security level or priority level may indicate wireless devices being used in public safety related operations or wireless devices being used for critical services. For example, a priority level may be set so that a regular user not having this level is blocked to use a specific spectrum in case of emergency. Further, access for a secure slice can be regulated, i.e. high security users have a separate handling in the core network so that the secure slice is exclusive to the secure service.

Figure 4:
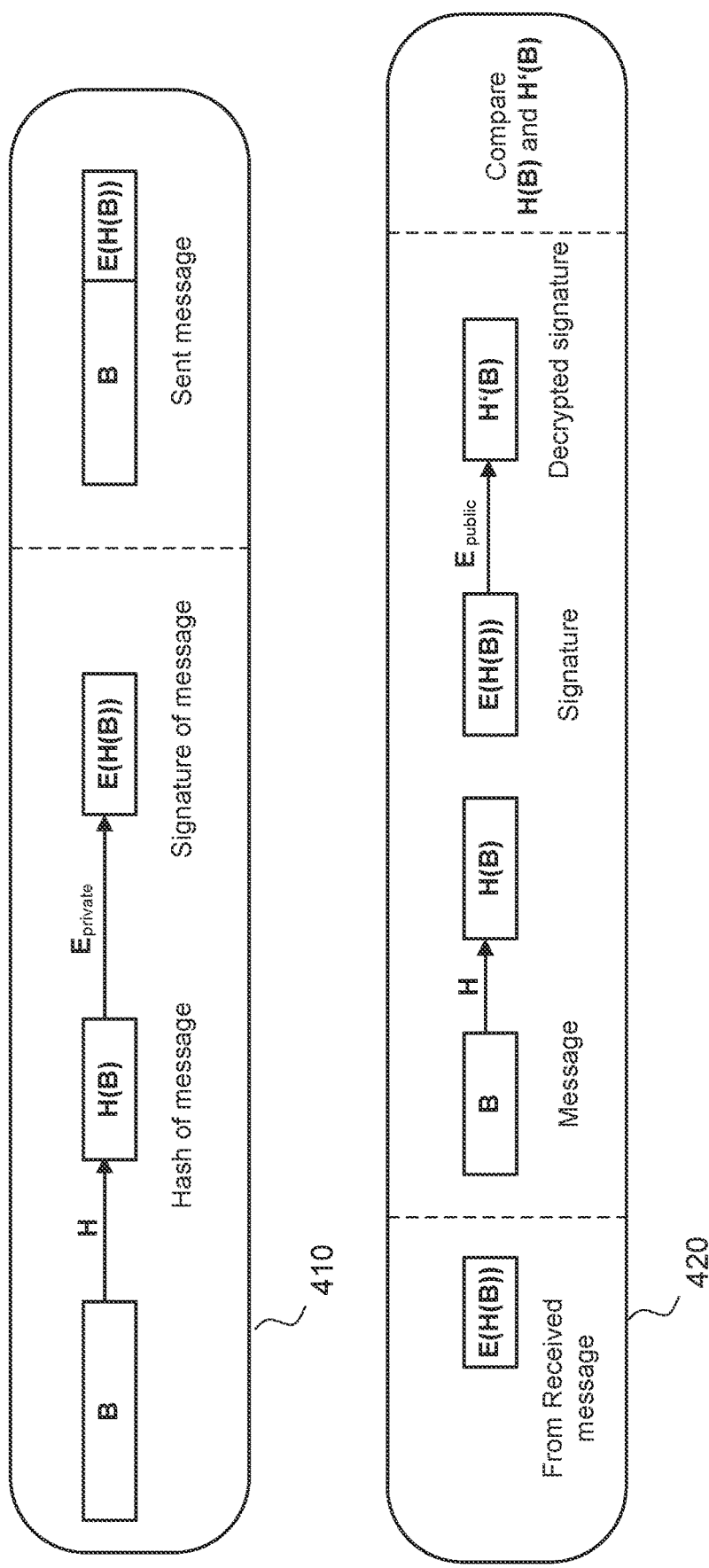
FIG. 4 explains the concept of deriving a verification signature from a message.

As can be seen from FIG. 4, a possible way of deriving a verification signature E(H(B)) from data, such as a message B including preferably at least the random bit sequence, at the wireless device, is shown in the upper part 410 of FIG. 4. Furthermore, a possible way of verifying this signature at a network node in the wireless communication system is shown in the lower part 420 of FIG. 4.

When deriving the verification signature from message B the random bit sequence as discussed in the above methods of FIGS. 2 and 3 may be used as message B.

Message B or its content may also be named verification string. The wireless device first calculates a hash value from message B, H(B), using a hash function. For this, either a commonly known hash function or a specifically designed hash function is used. In other words, the verification function comprises a hash function, and the step of calculating the verification signature comprises hashing at least the random bit sequence using the hash function.

Subsequently, the wireless device encrypts the hash value using either a commonly known encryption function or a specifically designed encryption function together with an encryption key, a key, a private key, a public key or any other piece information suitable for encrypting the hashed random bit sequence. In the example of FIG. 4, a private key is used. The thus obtained encrypted hash value may be also termed the verification signature or signature of the message. In other words, the verification function further comprises an encryption function, and the step of calculating the verification signature further comprises the step of encrypting at least the hashed random bit sequence using a key, such as the private key.

The process 420 of FIG. 4 may be used for verifying the signature at a network node.

At first, the network node receives the verification signature E(H(B)) derived in process 410 and transmitted from the wireless device. In more detail, this procedure comprises a step of receiving a verification signature from the wireless device in an uplink message of a random access procedure or in the first uplink message following a random access procedure, as explained above.

Moreover, the network node calculates a hash value from a message using a hash function. The message may be a random bit sequence in message B. In other words, the network node calculates a comparison signature from the random bit sequence using a network node verification function assigned to the device category. More specifically, the network node verification function may comprise a hash function, and calculating the comparison signature may comprise hashing at least the random bit sequence using the hash function. In this respect, in the context of calculating the comparison signature, the verification function may also be referred to as a comparison signature generation function, comparison generation function, signature generation function or similar. The message may be the same message B as used when deriving the verification signature from message B as described in process 410 above. The hash function may be the same hash function used when deriving the verification signature from message B as described in process 410 above.

The verification function in process 420 may further comprise a decryption function for decrypting the received verification signature. Then, the device category can be verified, i.e. it can be verified that that the wireless device belongs to the device category assigned to the verification function, if the calculated comparison signature matches the decrypted verification signature.

In more detail, the network node decrypts the verification signature E(H(B)) using a key. The key may be referred to as a cryptographic key, decryption key, encryption key, a private key, a public key or any other piece information suitable for decrypting the verification signature. In the example of FIG. 4, a public key is used, which forms a key pair together with the private key used in process 410. Thereby, the network node calculates the decrypted verification signature H'(B) in process 420.

Alternatively, a private key may be used in process 420 and a public key may be used in process 410. These keys may form a key pair together, allowing for increased security when verifying the category of the wireless device.

In the following, the network node compares the comparison signature to the decrypted verification signature. If the comparison signature and the decrypted signature match, the network node determines that the wireless device belongs to the device category assigned to the verification function used when decrypting the verification signature.

A specific example regarding encryption has been discussed above. Encryption is possible to do either using a shared secret, i.e. both transmitter and receiver know something that enables these to encrypt/decrypt or using a private key and a public key where the private key is kept secret while the public one can be distributed to a group of users, similar to FIG. 4. Private and public key methods can be used both to enable the owner of the private key to encrypt messages that then can be decrypted by anyone in possession of the public key. It can also be used to enable anyone in possession of the public key to encrypt messages that can only be read by the one in possession of the private key.

Using signatures is a method, as defined herein, to use a combination of the public/private key encryption and a shared (possibly secret) hash function.

Alternatively, instead of hashing with a hash function a check-sum scheme may be used for calculating a fixed length data string similar to the hashed random bit sequence. That is, any function having similar properties as hashing or check-sum functions may be used when obtaining the fixed length data string.

Figure 5:
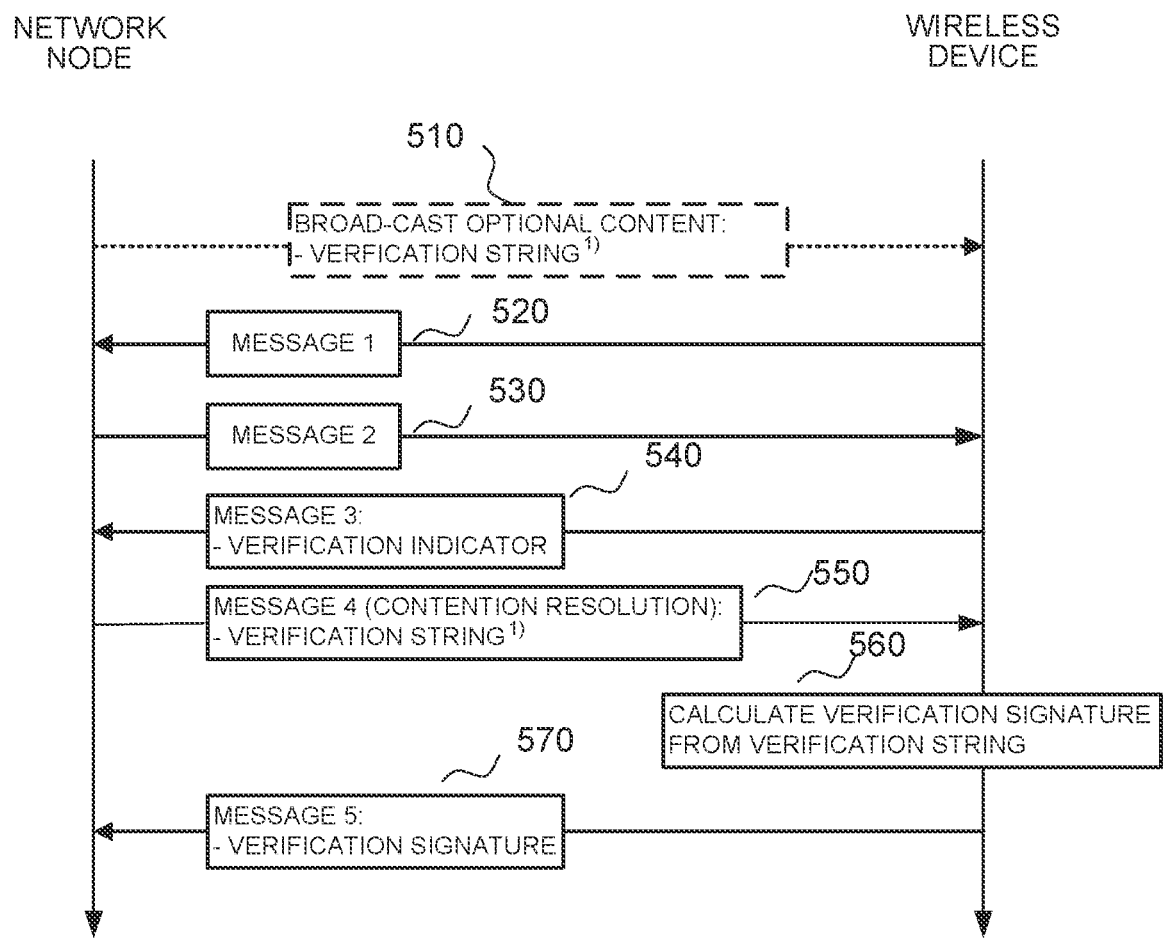
FIG. 5 illustrates signaling in a communication scheme between a network node and wireless device in a wireless communication system according to an embodiment.

FIG. 5 depicts possible configurations of the messages used in the random access procedure carrying the various pieces of information required when verifying the device category of a wireless device.

The pieces of information may be a random bit sequence (verification string), a bit indicator, a verification indicator, a verification signature. A message that is used for transmission may be any of the messages used in the random access procedure described above that are suitable for carrying the pieces of information. The messages may be named as message 1, message 2, message 3 and message 4 of the random access procedure. Moreover, a message that is used may be any of the messages used before the random access procedure, such as broadcast message, or directly after the random access procedure, such as a "message 5".

FIG. 5 provides a specific example of where the verification message may be allocated in the four messages used in the random access procedure. In other words, FIG. 5 provides a specific example which message carries or includes the random bit sequence (the verification string).

In this example, the random access procedure described above may be applied. E.g., the first message 520 and the second message 530 of the random access procedure are transmitted and received between the wireless device and the network node.

A verification indicator is transmitted in the third message 540 of the random access procedure. The third message is an uplink message used in the random access procedure. The verification indicator indicates that the wireless device supports verification of a device category. The random bit sequence, also referred to as verification string, is transmitted in the fourth message 550 of the random access procedure. The fourth message is a downlink message used in the random access procedure described above with regard to FIG. 3. The random access procedure comprises an exchange of at least four consecutive messages between the wireless device and a network node. The verification signature is calculated from the random bit sequence in 560 as derivable from the above description describing the details of FIG. 4. In the example of FIG. 5, the calculated verification signature is transmitted from the wireless device to the network node in the first uplink message 570 following the random access procedure. This message may be referred to as "message 5", fifth message, or any other expression that may cover the meaning of this message being sent immediately after the random access procedure is finished.

Alternatively, the verification string, i.e. the random bit sequence, may be included in a verification message in a broadcast message transmitted before the random access procedure, as indicated by message 510. The broadcast message may be transmitted from the network node to the wireless device. The wireless device may receive the broadcast message. That is, in this alternative, the verification message including the random bit sequence (verification string) may be included in or may be constitute the broadcast message.

Figure 6:
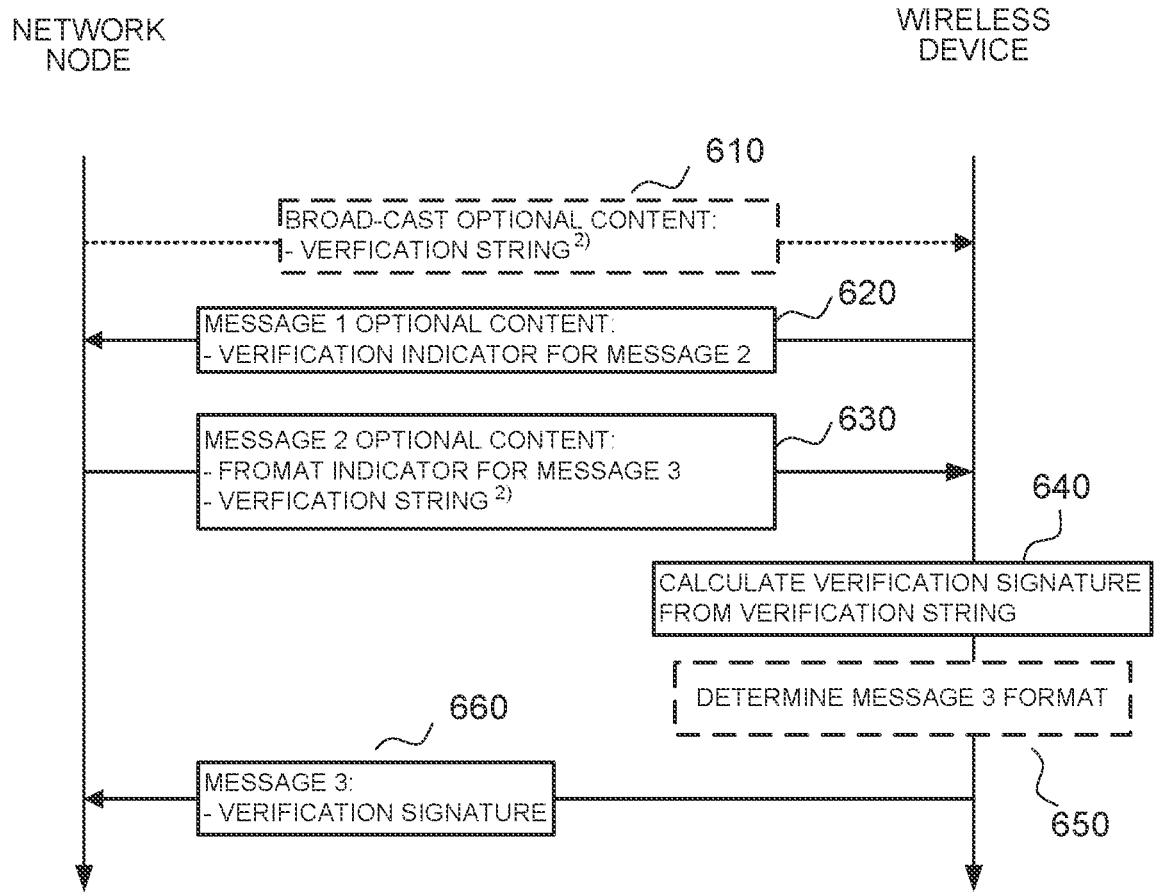
FIG. 6 illustrates signaling in another communication scheme between a network node and wireless device in a wireless communication system according to an embodiment.

FIG. 6 depicts another possibility of configurations of the messages used in the random access procedure carrying the various pieces of information required when verifying the device category of a wireless device.

The pieces of information may be a random bit sequence (verification string), a bit indicator, a verification indicator, a verification signature. A message that is used for transmission may be any of the messages used in the random access procedure described above that are suitable for carrying the pieces of information. Moreover, a message that is used may be any of the messages used before the random access procedure, such as a broadcast message, or just after the random access procedure, such as a "message 5".

FIG. 6 provides a specific example of where the verification message may be allocated in the messages used in the random access procedure. In other words, FIG. 6 provides a specific example of which messages may carry or include the random bit sequence, respectively the verification string.

In this example, the random access procedure described above may be applied. E.g., the first message 620 and the second message 630 and the third message 660 of the random access procedure are transmitted between the wireless device and the network node.

A verification indicator is transmitted in the first message 620 of the random access procedure. The random bit sequence, also referred to as verification string, is transmitted in the second message 630 of the random access procedure. The verification signature is calculated from the random bit sequence 640 in the manner described above when describing FIG. 4. The verification signature is calculated at the wireless device in 640 from the verification string (random bit sequence). The calculated verification signature is transmitted from the wireless device to the network node in the third message 660 of the random access procedure. The random access procedure may be the random access procedure as described above.

Optionally, a format indicator may be included in message 2 of the random access procedure. This format indicator, also called bit indicator above, is an indicator for message 3 of the random access procedure, determining a specific format that the wireless device shall use when transmitting message 3 comprising the verification signature to the network node. Based on the format indicator indicating the format of message 3, the wireless device may determine the format of message 3 of the random access procedure when applying the above described configuration of messages in 650.

Alternatively, the verification string, e.g. the random bit sequence, may be sent in a broadcast message transmitted before the random access procedure in 610, similar to FIG. 5.

In one embodiment, the network assigns a verification function, e.g. a key and/or a hash function (key/hash), to a category of wireless devices, e.g. an user equipment (UE), in a device category related to priority or security. Alternatively, all wireless devices use the same verification function but are provided (assigned) with different long-term (semistatic) seeds associated to a device category that is saved by the wireless device, for example, when the wireless device first attaches to the network over encrypted and integrity protected non-access stratum, NAS, signaling.

Then, a network node receives a random access attempt from a wireless device. The network node sends a verification string to said wireless device, for example dedicated in the random access message 4 or through a broadcast message, as explained with respect to FIG. 5. The wireless device calculates verification signature (key/hash) according to the key and/or hash function this device has been assigned, if any of a key or hash have been assigned. The wireless device includes the calculated verification signature in a random access message 5, as in FIG. 5. The network node receives a verification signature in message 5 from said wireless device. The wireless device is classified according to the verification message, i.e. if the verification message corresponds to said device category, key/hash classify said wireless device as belonging to said corresponding category relating to priority or security.

In some embodiments, a wireless device category is associated with a network slice, i.e. wireless devices connecting to a slice are given a key and/or hash function for this slice. In some embodiments the wireless device category is all wireless devices for an operator of a network. In some embodiments the wireless device category is the subscription category, i.e. MBB UEs, Internet of Things (IoT) UEs, public safety UEs, Ultra-Reliable Low-Latency Communication (URLLC) UEs, gold subscription UEs, etc.

In some embodiments the wireless device key is a private key and the network node key is a public key, as explained in FIG. 4, where public thus is limited to the security category of the wireless device, i.e. it is not "public" but rather the public key in terms of encryption keys used for generating signatures as described above.

The verification of the wireless device is done prior to establishing a core network connection to reduce overhead and time. The skilled person realizes that the network could include the verification-string, random bit sequence, in message 2 of the random access procedure allowing the wireless device to include the verification signature in message 3 of the random access procedure. However, since contention resolution takes place in message 4 of the random access procedure, the processing spent on calculating the verification signature before contention resolution is wasted in wireless devices that were not detected in message 3 of the random access procedure. Note also that, even if the network decides to provide the verification string (random bit sequence) in message 2 of the random access procedure, the wireless device could decide to provide the validation signature in message 5 of the random access procedure.

In some embodiments the verification function(s) is(are) either assigned as part of the device at the point of manufacturing, assigned as part of the SIM/USIM in the subscription provisioning process, or derived from any of the existing authentication algorithms already stored on the SIM/USIM.

In some further embodiments, if verification of the wireless device can be performed using one out of a set of multiple verification functions the actual verification function to use is either indicated to the wireless devices as part of the initial NAS signaling exchange or alternatively as part of a downlink RRC message such as message 2 or message 4 of the random access procedure.

From an overhead perspective the verification string (random bit sequence) may be sent in a broadcast message if any of the above methods and operations are often used. If these operations are rarely used dedicated signalling may be used. Thus, in an embodiment the verification message is included in a broadcast message that can be dynamically turned on. The broadcast message may be turned on when many message 5 verifications are needed.

In another embodiment, prioritized access to high priority wireless devices using the above described category verification may be used.

E.g., in the random access procedure, the network typically does not know the wireless devices' category unless this is done by identifying this through the random access preamble. For this embodiment preamble identification is not needed and overhead can thus be saved by not e.g. portioning the available preambles, but this embodiment also works if preamble identification is used.

What the network comprising the at least one network node does in this embodiment is that it has a set of functions that used when performing calculation while verifying verification signatures. Here, the operation or operations performed in the network depends on the type of verification function deployed. In a first embodiment, the network comprising the at least one network node calculates the verification signature for all deployed device categories. The network then compares the received verification signature from the wireless device to this set of verification signatures. In one embodiment, the network stops if a match is found, prior to calculating all possible verification signatures.

In a further embodiment, the operations are the same as in the above embodiment, and furthermore private/public keys are used and the network decodes the received signature with the private keys for all the wireless device categories or until a match is found.

If the wireless device matches one of the categories, in other words, if the device's category is verified, (one of which can be the complement to all wireless devices assigned a verification function, e.g. legacy UEs) this may be used to determine the access procedure for this wireless device; one access procedure can be to not allow access to the network.

In another embodiment, conditional usage of verification signatures in message 3 or message 5 of the random access procedure described above is applied. The wireless device is not always sending a message 3 or message 5 of the random access procedure including the verification signature. This may be done to avoid increasing the size of message 3 or message 5 of the random access procedure or to avoid unnecessary processing spent on calculating the verification signature. In this embodiment, the wireless device is only using a specific type of verification message configured such that the random access is prioritized. This approach may be applied when, for instance, a low latency service needs to send data or a prior random access attempt has failed, etc. In one embodiment, the wireless device may choose not to include the verification signature in message 3 of the random access procedure if the path gain is low and/or a link budget is suited for a smaller message 3.

In yet another embodiment, a broadcast message includes the verification message transmitted to the wireless device when verifying the device category. The broadcast message may be included in one of the legacy broadcast messages, e.g., commonly known broadcast messages, such as paging messages, broadcasting system information used in radio resource control, transmissions in the physical broadcast channel (PBCH), the broadcast channel (BCH), the broadcast control channel (BCCH). In another embodiment, the broadcast message including the verification signature can be an extension of the above legacy broadcast messages. In yet another embodiment, the broadcast message including the verification signature can be a conditional broadcast message.

In another embodiment, the broadcast message is conditional on baring information. E.g., if a cell which is provided by a network node of a network is bared for general random access due to overload, a baring indicator transmitted from the network node comprised in the network signals to the wireless device that an additional broadcast message is available containing the verification string (random bit sequence) wherein the verification string is to be used in the above described random access procedure.

In another embodiment, there is dedicated transmission of a verification string to the wireless device for verification of a device category of the wireless device. In this embodiment, the verification message is included in message 2 of the above described random access procedure, shown in FIG. 6. Message 2 may be appended with an additional data container, e.g. the physical downlink shared channel, PDSCH. In an embodiment, this appending depends on the choice of the random access preamble in the random access procedure. Legacy wireless devices are usually configured to receive a message 2 of the random access procedure which do not comprise the verification message including the verification string (random bit sequence). If the verification string (random bit sequence) is transmitted in the appended data container, e.g. the PDSCH, this would be ignored by legacy wireless devices.

In an embodiment, the verification message is included as an extension of message 2 of the random access procedure carried out by legacy wireless devices. In another embodiment the format of message 2 of the random access procedure described above is dynamically adjusted by the network comprising the at least one network node. This is based on whether the network wanting the wireless devices to provide the verification signature. In another embodiment, the verification string (random bit sequence) is in included in the broadcast message.

In another embodiment, the wireless device is configured to transmit the verification signature based on receiving a bit-indicator. The bit indicator is signaled by a bit or code-point in message 4 or message 2 of the above described random access procedure. The bit indicator indicates that the network node requests the wireless device to transmit a calculated verification signature.

Another embodiment concerns the case where resource selection for a message is based upon authentication message. One problem with a random access channel, RACH, overload attack is that the resources for message 1, 3 of the random access procedure described above can be overloaded. The verification message can be used to generate the physical resources used to transmit messages. Hence, the random access resource, message 1 of the random access procedure described above, can be selected by encoding the verification message in the verification string (random bit sequence) that is transmitted in the broadcast message. In yet another embodiment, the resource for transmitting the third message (message 3) of the above described random access procedure is encoded into the verification string (random bit sequence) for both of the verification string (random bit sequence) being included in the verification message as part of the broadcast message or being included in the second message (message 2) of the above described random access procedure.

The advantage of the above embodiments is that much less signaling is needed to detect that a device is trying to spoof being member of a prioritized device category. Hence, a prioritized high security device can quicker be identified and given access to the system. Accordingly, much improved performance can be given to critical services when the system is under attack by e.g. compromised IoT UEs.

Figure 7:
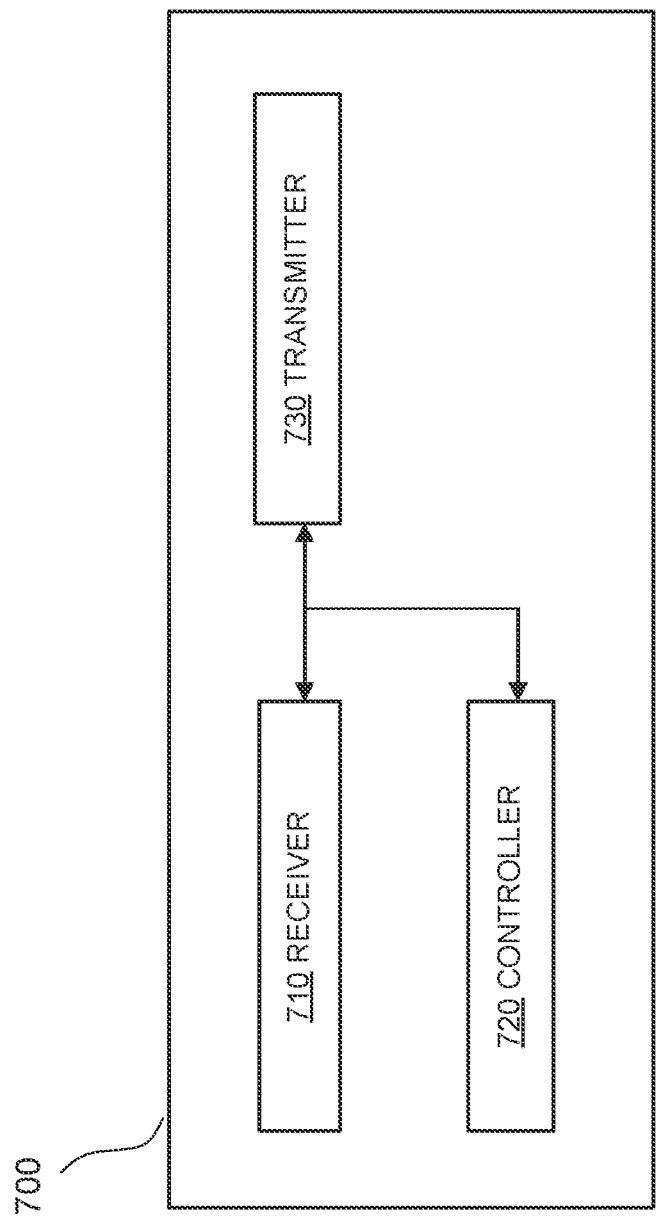
FIG. 7 illustrates element of a wireless device according to an embodiment.

FIG. 7 depicts a configuration of a wireless device 700 illustrating possible individual functional elements of the device. Here, the wireless device 700 comprises a receiver 710, a controller 720 and a transmitter 730. The elements, which may also be referred to as modules in the following, are adapted to carry out multiple functions, in particular, the steps/functions of the described methods, e.g. presented in FIG. 2. Regarding details of the functions of these elements/modules, it is referred to the above explanation to avoid unnecessary repetition.

In more detail, FIG. 7 illustrates elements of the device 700 configured to support verification of a device category. The receiver 710 is configured to receive from a network node a verification message including a random bit sequence. The controller 720 is configured to calculate a verification signature from the random bit sequence by using a verification function assigned to the device category. The transmitter 730 is configured to transmit the calculated verification signature to the network node in an uplink message of a random access procedure or in the first uplink message following a random access procedure so as to allow verification of the device category using the verification signature at a network node. Specifically, the controller 720 may be one or more tangible elements or software functions running on a processor.

In one embodiment, the wireless device may have a configuration comprising a processor and a memory, said memory containing instructions executable by said processor, whereby said wireless device is operative to carry out the steps of the above methods, in particular steps 210, 220 and 230.

Figure 8:
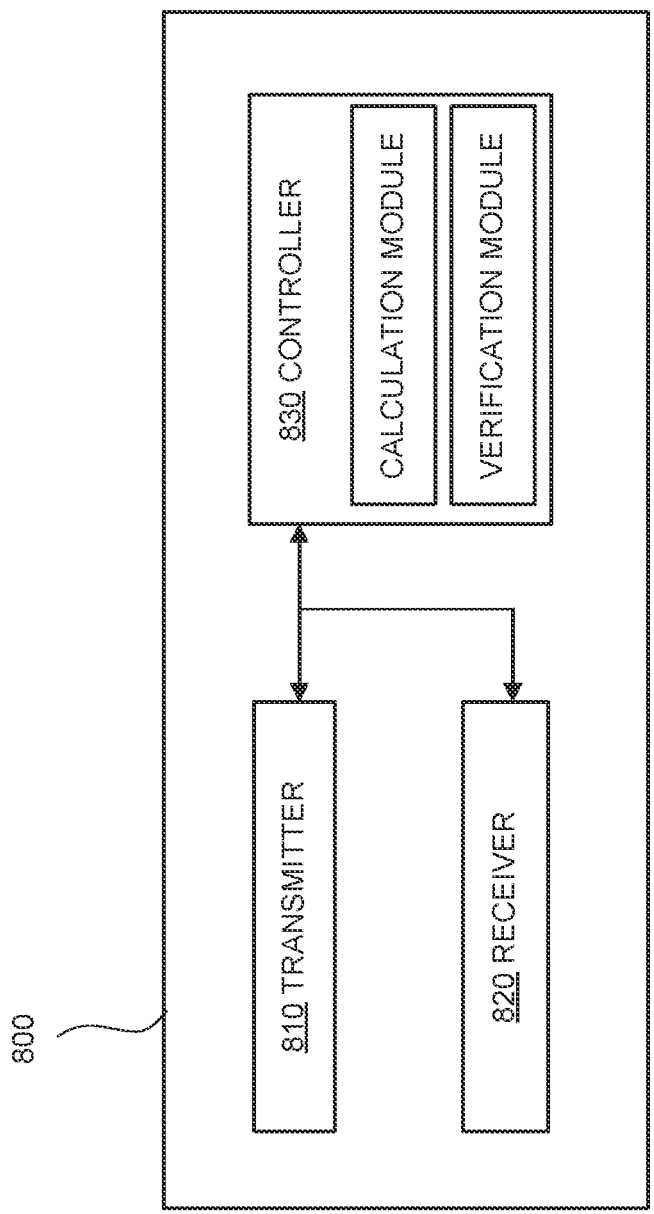
FIG. 8 illustrates element of a network node according to an embodiment.

FIG. 8 depicts a configuration of a network node 800 illustrating possible individual functional elements of the node. Here, the node 800 comprises a transmitter 810, a controller 830 and a receiver 820. The elements are adapted to carry out multiple functions, in particular, the steps/functions of the described methods, e.g. presented in FIG. 3. Regarding details of the functions of these elements/modules, it is referred to the above explanation to avoid unnecessary repetition.

In more detail, FIG. 8 illustrates elements of the node 800 configured for verification of a device category. The transmitter 810 is configured to transmit to a wireless device a verification message including a random bit sequence. The receiver 820 is configured to receive a verification signature from the wireless device in an uplink message of a random access procedure or in the first uplink message following a random access procedure. The controller is configured to initiate, e.g. by means of a calculation module, calculation of a comparison signature from the transmitted random bit sequence using a verification function assigned to the device category. The controller is further configured to initiate, e.g. by means of a verification module, verification that the wireless device belongs to the device category assigned to the verification function based on a comparison using the calculated comparison signature and the received verification signature. Specifically, the controller 830 may be one or more tangible elements or software functions running on a processor.

In one embodiment, the network node 800 may have a configuration comprising a processor and a memory, said memory containing instructions executable by said processor, whereby said node is operative to carry out the steps of the above methods, in particular steps 410, 420, 430 and 440.

The above-mentioned processors may initiate or carry out at least some of the above described functions, specifically the functions discussed in the steps of the methods.

Accordingly, the same advantages which are achieved with the above described methods can also be achieved by the device and the network node. The wireless device 700 and the network node 800 may form a wireless communication system.

In particular, the receiver and transmitter may be implemented as transceiver so as to receive/transmit messages.

As is understood by the skilled person, the wireless device 700 and network node 800 may include a bus, a processing unit, a main memory, a ROM, a storage device, an I/O interface consisting of an input device and an output device, and a communication interface, such as a transceiver. The bus may include a path that permits communication among the components. Processing unit may include a processor, a microprocessor, or processing logic that may interpret and execute instructions and may form the main part of a controller, such as controllers 720, 830. Main memory may include a RAM or another type of dynamic storage device that may store information and software instructions for execution by processing unit.

The wireless device and network node may perform certain operations or processes described herein. They may perform these operations in response to processing unit executing software instructions contained in a computer-readable medium. A computer-readable medium may be defined as a physical or a logical memory device. For example, a logical memory device may include memory space within a single physical memory device or distributed across multiple physical memory devices.

The software instructions contained in a main memory may cause the processing unit including a processor, when executed on the processor, to cause the processor to perform operations or processes described herein. Alternatively, hardwired circuitry may be used in place of or in combination with software instructions to implement processes and/or operations described herein. Thus, implementations described herein are not limited to any specific combination of hardware and software.

The physical entities according to the different embodiments of the invention, including the elements, devices, nodes and systems, may comprise or store computer programs including software instructions such that, when the computer programs are executed on the physical entities, steps and operations according to the embodiments of the invention are carried out, i.e. cause processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term controller is used, no restriction is made regarding how distributed this element may be and regarding how gathered these elements may be. That is, the constituent elements may be distributed in different software and hardware components or other elements for bringing about the intended function. A plurality of distinct elements may also be gathered for providing the intended functionalities.

Figure 9:
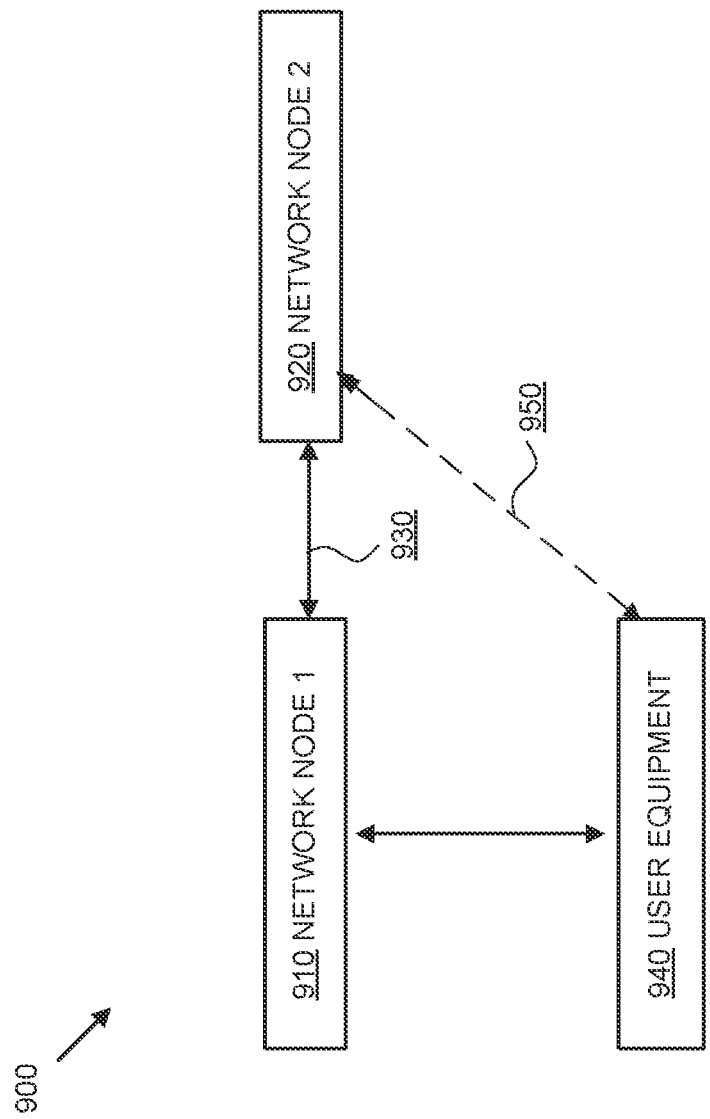
FIG. 9 illustrates how different network nodes may carry out the operations of FIG. 3.

Further, the functions of the network node 800 may be distributed over several network nodes as indicated in FIG. 9 depicting two nodes. For example, network node 910 may receive and transmit messages from/to the wireless device 940 and forward the information received to network node 920 via communication channel 930. Further, it is also possible that occasionally the device 940 communicates directly with node 920 as indicated in 950. The nodes and device in FIG. 9 form system 900.

Further, the elements of the devices or nodes or system may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention claimed is:

1. A method to be carried out in a wireless device of a wireless communication system, for supporting verification of a device category of the wireless device, comprising:
   receiving, from a network node, a verification message including a random bit sequence;
   calculating a verification signature from the random bit sequence by using a verification function assigned to the device category of the wireless device, wherein the device category is associated with a security level or priority level shared by a group of wireless devices; and
   transmitting the calculated verification signature to the network node in an uplink message of a random access procedure or in the first uplink message following a random access procedure.

2. The method of claim 1, wherein the verification message is included in a broadcast message transmitted before the random access procedure or included in a downlink message used in the random access procedure.

3. The method of claim 2, wherein the downlink message used in the random access procedure is the second or fourth message of the random access procedure comprising an exchange of at least four consecutive messages between the wireless device and a network node.

4. The method of claim 1, further comprising transmitting, to the network node in an uplink message, a verification indicator indicating that the wireless device supports verification of a device category.

5. The method of claim 4, wherein the uplink message carrying the verification indicator is the first or third message of the random access procedure comprising an exchange of at least four consecutive messages between the wireless device and the network node.

6. The method of claim 1, further comprising receiving, in a downlink message in the random access procedure, a bit-indicator indicating that the network node requests the wireless device to transmit the calculated verification signature.

7. The method of claim 6, wherein the downlink message carrying the bit-indicator is the second or fourth message of the random access procedure comprising an exchange of at least four consecutive messages between the wireless device and the network node.

8. The method of claim 1, wherein the verification function comprises a hash function, and wherein calculating the verification signature comprises hashing at least the random bit sequence using the hash function.

9. The method of claim 8, wherein the verification function further comprises an encryption function, and wherein calculating the verification signature further comprises encrypting at least the hashed random bit sequence using a key.

10. The method of claim 1, wherein the verification function is provided with a seed as the random bit sequence associated with the device category.

11. A wireless device of a wireless communication system for supporting verification of a device category of the wireless device, the wireless device comprising:
a processor and a memory, the memory containing instructions executable by the processor whereby the wireless device is configured to:
receive, from a network node, a verification message including a random bit sequence;
calculate a verification signature from the random bit sequence by using a verification function assigned to the device category of the wireless device, wherein the device category is associated with a security level or priority level shared by a group of wireless devices; and
transmit the calculated verification signature to the network node in an uplink message of a random access procedure or in the first uplink message following a random access procedure.

12. The wireless device of claim 11, wherein the verification message is included in a broadcast message transmitted before the random access procedure or included in a downlink message used in the random access procedure.

13. The wireless device of claim 12, wherein the downlink message used in the random access procedure is the second or fourth message of the random access procedure comprising an exchange of at least four consecutive messages between the wireless device and a network node.

14. The wireless device of claim 11, the memory containing instructions executable by the processor whereby the wireless device is further configured to transmit, to the network node in an uplink message, a verification indicator indicating that the wireless device supports verification of a device category.

15. The wireless device of claim 14, wherein the uplink message carrying the verification indicator is the first or third message of the random access procedure comprising an exchange of at least four consecutive messages between the wireless device and the network node.

16. The wireless device of claim 11, the memory containing instructions executable by the processor whereby the wireless device is further configured to receive, in a downlink message in the random access procedure, a bit-indicator indicating that the network node requests the wireless device to transmit the calculated verification signature.

17. The wireless device of claim 16, wherein the downlink message carrying the bit-indicator is the second or fourth message of the random access procedure comprising an exchange of at least four consecutive messages between the wireless device and the network node.

18. The wireless device of claim 11, wherein the verification function comprises a hash function, and wherein the memory contains instructions executable by the processor whereby the wireless device is configured calculate the verification signature by hashing at least the random bit sequence using the hash function.

19. The wireless device of claim 18, wherein the verification function further comprises an encryption function, and wherein the memory contains instructions executable by the processor whereby the wireless device is configured calculate the verification signature by encrypting at least the hashed random bit sequence using a key.

20. The wireless device of claim 11, wherein the verification function is provided with a seed as the random bit sequence associated with the device category.

* * * * *